United States Patent
Wang et al.

(10) Patent No.: US 12,422,672 B2
(45) Date of Patent: Sep. 23, 2025

(54) AUXILIARY DISPLAY METHOD, DEVICE AND SYSTEM FOR OPERATING MACHINERY, AND OPERATING MACHINERY AND ELECTRONIC EQUIPMENT

(71) Applicant: SHANGHAI SANY HEAVY MACHINERY CO., LTD., Shanghai (CN)

(72) Inventors: Chuanyu Wang, Shanghai (CN); Chao Zeng, Shanghai (CN); Zhiyuan Jiang, Shanghai (CN)

(73) Assignee: SHANGHAI SANY HEAVY MACHINERY CO., LTD, Shanghai (CN)

( * ) Notice: Subject to any disclaimer, the term of this patent is extended or adjusted under 35 U.S.C. 154(b) by 57 days.

(21) Appl. No.: 17/920,737

(22) PCT Filed: Oct. 18, 2021

(86) PCT No.: PCT/CN2021/124352
§ 371 (c)(1),
(2) Date: Oct. 21, 2022

(87) PCT Pub. No.: WO2022/213576
PCT Pub. Date: Oct. 13, 2022

(65) Prior Publication Data
US 2024/0019693 A1  Jan. 18, 2024

(30) Foreign Application Priority Data
Apr. 8, 2021 (CN) .......................... 202110379683.6

(51) Int. Cl.
*G02B 27/01* (2006.01)
*A61F 13/53* (2006.01)
*G02B 27/00* (2006.01)

(52) U.S. Cl.
CPC .... *G02B 27/0101* (2013.01); *G02B 2027/014* (2013.01); *G02B 2027/0141* (2013.01); *G02B 2027/0196* (2013.01)

(58) Field of Classification Search
CPC ......... G01S 11/12; G01S 1/02; G05D 1/0038; G05D 1/0246; G02B 27/144;
(Continued)

(56) References Cited

U.S. PATENT DOCUMENTS 11,634,890 B2 * 4/2023 Tanimoto ................ E02F 9/264
 701/34.2
11,939,746 B2 * 3/2024 Kiyota ................... H04N 5/272
(Continued)

FOREIGN PATENT DOCUMENTS

| CN | 102277893 A | 12/2011 |
| CN | 105379503 A | 3/2016 |

(Continued)

OTHER PUBLICATIONS

First Office Action of Priority CN202110379683.6.
(Continued)

*Primary Examiner* — Dawayne Pinkney
(74) *Attorney, Agent, or Firm* — Womble Bond Dickinson (US) LLP

(57) ABSTRACT

The present application provides an auxiliary display method, device and system for operating machinery and an electronic equipment, and the auxiliary display method for operating machinery incudes: receiving current working parameters of the operating machinery; generating numerical information used to characterize the working parameters and image information used to characterize a difference degree between the working parameters and target parameters based on the working parameters and the target parameters; and displaying the numerical information in a first (Continued)

display area of a windshield of the operating machinery and the image information in a second display area of the windshield. According to the auxiliary display device for operating machinery provided in the present application, through the acquisition of difference degree information and the displaying of the combination of numerical information and image information, the selection of key information and the intuitive and clear displaying of key information are realized, and the safety of operation process is enhanced.

12 Claims, 6 Drawing Sheets

(58) Field of Classification Search
CPC ............ G02B 27/0172; G02B 27/0149; G02B 27/145; G02B 27/0103; G02B 26/001; G02B 27/0101; G02B 27/017; G02F 1/03; A01B 69/001; G09G 3/003; G09G 2360/144; B43L 13/18; H04N 7/18; B82Y 20/00; B60R 1/00; G06T 19/00; G06T 19/006
USPC ... 359/629–636, 618, 639, 13–14, 237, 245, 359/247; 345/7–9, 632, 633, 207; 348/113–120; 349/11
See application file for complete search history.

(56) References Cited

U.S. PATENT DOCUMENTS

| | | |
|---|---|---|
| 2014/0019018 A1 | 1/2014 | Baumgarten et al. |
| 2014/0099178 A1* | 4/2014 | Nomura .................... E02F 9/26 |
| | | 414/685 |
| 2018/0363273 A1 | 12/2018 | Ohiwa et al. |
| 2019/0302453 A1* | 10/2019 | Oshima .................. G03B 21/10 |
| 2020/0165798 A1* | 5/2020 | Nishi ........................ E02F 9/26 |
| 2020/0263395 A1 | 8/2020 | Ohiwa et al. |

FOREIGN PATENT DOCUMENTS

| | | |
|---|---|---|
| CN | 107422042 A | 12/2017 |
| CN | 109462750 A | 3/2019 |
| CN | 111290684 A | 6/2020 |
| CN | 112965682 A | 6/2021 |

OTHER PUBLICATIONS

First Search of Priority CN202110379683.6.
International Search Report mailed on Jan. 17, 2022.
First Examination Report received in related Indian application No. 202217059867, mailed Apr. 3, 2025, 7 pages.

* cited by examiner

AUXILIARY DISPLAY METHOD, DEVICE AND SYSTEM FOR OPERATING MACHINERY, AND OPERATING MACHINERY AND ELECTRONIC EQUIPMENT

CROSS-REFERENCE TO RELATED APPLICATIONS

The present application is the National Phase of International Application No. PCT/CN2021/124352 filed on Oct. 18, 2021, which claims priority to the benefit of Chinese Patent Application no. 202110379683.6 filed Apr. 8, 2021, and the disclosures of which are hereby incorporated herein by reference in their entireties.

TECHNICAL FIELD

The present application relates to the technical field of construction machinery, and more specifically, to an auxiliary display method, device and system for operating machinery, and an operating machinery and an electronic equipment.

BACKGROUND

At present, auxiliary operation functions of domestic and overseas operating machinery are displayed through a control panel, and an operator needs to read data from the panel during operation. However, the size of the panel is small, and icons and fonts displayed on the panel are also small due to the constraints of panel size, so the information display is indistinct. Especially for the operating machinery, the operator needs to maintain a high level of attention to operating components (such as a bucket of an excavator) for safety reasons. However, for the operating machinery in prior art, the operator needs to look down or turn around to observe the panel in detail, so that the operator's attention is dispersed, and the operation safety is affected.

SUMMARY

The present application provides an auxiliary display method, device and system for operating machinery, and an operating machinery and an electronic equipment, to solve the defect in the prior art that the information display on the operating machinery is complex and indistinct, which affects the safety during operation, thereby realizing simple and safe operation of the operating machinery.

In a first aspect, an auxiliary display method for operating machinery according to the present application includes: receiving current working parameters of the operating machinery; generating numerical information used to characterize the working parameters and image information used to characterize a difference degree between the working parameters and target parameters based on the working parameters and the target parameters; and displaying the numerical information in a first display area of a windshield of the operating machinery and displaying the image information in a second display area of the windshield.

The auxiliary display method for operating machinery according to the present application realizes the selection of key information and the intuitiveness and clarity of displaying of the key information through the obtaining of the difference degree information and the displaying of a combination of numerical and image information, while enhancing the safety during operation.

According to the auxiliary display method for operating machinery provided by the present application, the displaying the image information in the second display area of the windshield includes: displaying the image information in the second display area with a target length, where the target length is related to an absolute value of the difference degree.

According to the auxiliary display method for operating machinery provided by the present application, the method further includes outputting prompt information when the different degree is less than a target value.

According to the auxiliary display method for operating machinery provided by the present application, the displaying the image information in the second display area of the windshield includes: displaying the image information in the second display area on a first side of the first display area when the working parameters are less than the target parameters; and displaying the image information in the second display area on a second side of the first display area when the working parameters are greater than the target parameters; where the working parameters include stretching parameters and height parameters.

According to the auxiliary display method for operating machinery provided by the present application, the displaying the image information in the second display area of the windshield includes: displaying a reference mark at a target position of the second display area based on the target parameters, where the second display area includes two segments on both sides of the first display area; and displaying the image information in a target color in the second display area, and a distance between the image information and the reference mark is positively correlated with the absolute value of the difference degree; where the working parameters include rotation angle parameters.

According to the auxiliary display method for operating machinery provided by the present application, the displaying the numerical information in the first display area of the windshield of the operating machinery includes: displaying the target parameters and the current working parameters in the first display area when a rotary auxiliary mode is turned on; and displaying a roll angle and a pitch angle in the first display area when the rotary auxiliary mode is turned off.

In a second aspect, an auxiliary display device for operating machinery according to the present application includes: an input module, a processing module and an output module. The input module obtains current working parameters and target parameters of the operating machinery; the processing module calculates a difference degree between the working parameters and the target parameters; and the output module generates numerical information used to characterize the working parameters, and image information used to characterize the difference degree between the working parameters and target parameters, outputs the numerical information to a first display area on a windshield, and outputs the image information to a second display area on the windshield.

In a third aspect, an auxiliary display system for operating machinery according to the present application includes an information acquisition device, which is configured to collect current working parameters of the operating machinery; a windshield, which includes a first display area and a second display area; and a display device and a controller, where the controller is electrically connected with the information acquisition device and the display device, and configured to control the display device to output numerical information used to characterize working parameters and image information used to characterize a difference degree between the working parameters and target parameters based on the target parameters and the working parameters of the operating machinery, and display the numerical information in the first display area and display the image information in the second display area.

According to the auxiliary display system for operating machinery provided by the present application, the display device includes: a display screen and a lamp belt on both sides of the display screen, where the display screen is provided in the first display area and the lamp belt is provided in the second display area.

According to the auxiliary display system for operating machinery provided by the present application, the display device includes: a first display module, a second display module and a third display module, where each of the first display module, the second display module and the third display module includes a display screen and the lamp belt on both sides of the display screen; the first display module and the third display module are respectively provided on left and right sides of the windshield, and extending vertically; and the second display module is provided on an upper middle part of the windshield and extending horizontally.

The auxiliary display system for operating machinery provided by the present application realizes clear and intuitive displaying of the key information by outputting the numerical information for characterizing the working parameters and the image information for characterizing a difference degree between the working parameters and target parameters on the windshield, thereby improving the safety during the operating process.

In a fourth aspect, the present application provides an operating machinery, which includes the above-mentioned auxiliary display system for operating machinery.

In a fifth aspect, the present application provides an electronic equipment, which includes a memory, a processor and a computer program stored in the memory and executable by the processor, where the processor, when executing the program, implements steps of any one of the above-mentioned auxiliary display method for operating machinery.

In a sixth aspect, the present application provides a non-transitory computer readable storage medium on which a computer program is stored, where the computer program, when executed by the processor, causes the processor to implement steps of any one of the above-mentioned auxiliary display method for operating machinery.

The auxiliary display method for operating machinery according to the present application realizes the selection of key information and the intuitiveness and clarity of the display of the key information through the obtaining of the difference degree information and the displaying of a combination of numerical and image information, while enhancing the safety during operation.

BRIEF DESCRIPTION OF THE DRAWINGS

In order to more clearly illustrate the solutions according to the present application or the prior art, the accompanying drawings used in the description of the embodiments or the prior art will be briefly introduced below. It should be noted that the drawings in the following description are a part of embodiments of the present application. For those of ordinary skill in the art, other drawings can also be obtained according to these drawings without creative efforts.

DETAILED DESCRIPTION

Figure 1:
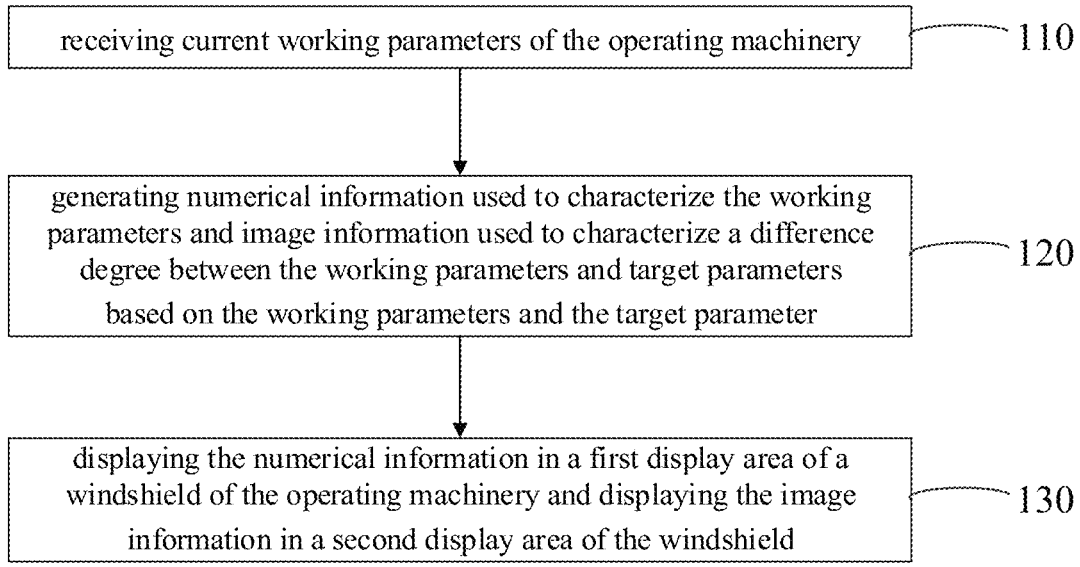
FIG. 1 is a flow diagram of an auxiliary display method for operating machinery according to the present application.

| Reference numerals: | |
|---|---|
| 210: first display area; | 211: mark area; |
| 212: numerical area; | 213: target parameter display area; |
| 214: working parameter display area; | 215: roll angle display area; |
| 216: pitch angle display area; | 220: second display area; |
| a: height information display area; | b: rotary auxiliary/state information display area; |
| c: extension information display area; | d: windshield; |
| 1010: input module; | 1020: processing module; |
| 1030: output module; | 1100: auxiliary display system for operating machinery; |
| 1110: information acquisition device; | 1120: controller; |
| 1121: communication module; | 1122: data analysis module; |
| 1123: display information processing module; | 1124: display driving module; |
| 1130: display device; | 1131: first display module; |
| 1132: second display module; | 1133: third display module. |

In order to more clearly illustrate the objectives, solutions, and advantages of the present application, the solutions of the present application will be clearly and completely described below in combination with the accompanying drawings of the present application. It should be noted that, the described embodiments are a part of embodiments of the present application, rather than all the embodiments. Based on the embodiments of the present application, all other embodiments obtained by those of ordinary skill in the art without creative effort fall within the scope of protection of the present application.

The terms 'first' and 'second' in the description and claims of the present application are used to distinguish similar objects, and are not used to describe a specific order or sequence. Character '/' generally indicates an 'or' relationship between the associated objects.

An auxiliary display method, device and system for operating machinery, and an operating machinery and an electronic equipment of this application will be described below with reference to FIG. 1 to FIG. 12.

The operating machinery in the present application can be a tower crane, a truck crane, an excavator, a piling machine, concrete machinery, a road roller, a concrete mixer, a boring machine, a pump truck or a fire truck.

As shown in FIG. 1, the auxiliary display method for operating machinery provided by the embodiments of the present application includes step 110, step 120 and step 130. The executive body of the auxiliary display method can be a controller of the operating machinery, or the whole operating machinery, or a remote control center.

In step 110, current working parameters of the operating machinery are received.

It should be noted that the working parameters are monitored parameters of various power mechanisms or executing mechanisms of the operating machinery, and different operating machinery may have different working parameters.

For example, when the operating machinery is an excavator, the working parameters may include at least part of the followings: a current height of a bucket tooth tip from a reference point, a current horizontal extension distance of the bucket tooth tip from the reference point, a current rotation angle, a body roll angle and a body pitch angle. The reference point can be a point of a target slope.

For other operating machinery, such as a crane, the working parameters may include at least part of the followings: quality of lifting material, a lifting speed, a horizontal position, angle, amplitude and percentage of torque.

The above-mentioned working parameters can be collected by various sensors provided on the operating machinery, and transmitted to the controller of the operating machinery.

In step 120, numerical information used to characterize the working parameters and image information used to characterize a difference degree between the working parameters and target parameters are generated based on the working parameters and the target parameters.

It should be noted that the target parameters include a target position and a target state of the operating machinery, which corresponds to a target value to be achieved by the above-mentioned working parameters.

In other words, the target parameters are used to characterize a target position or a target state that a certain mechanism of the operating machinery needs to reach or be adjusted to.

The difference degree can be measured by mathematical methods, and can be a difference between the working parameters and the target parameters or a ratio of the working parameters to the target parameters.

The difference degree between the working parameters and the target parameters is used to characterize the difference between two types of parameters, such as a current height of a bucket tooth tip of the excavator from a reference point, and a ratio of the current lifting speed of the crane to a preset lifting speed of the crane.

It should be noted that the comparison of the difference degree is aimed at the same parameter of the same mechanism. For example, for an excavator, the comparison is performed between a current rotation angle and a target rotation angle; and for a crane, the comparison is performed between a current horizontal position of material and a target horizontal position of the material.

By obtaining the difference degree between the current working parameters and the target parameters, the selection of the key information is realized, which facilitates a quick leaning of the difference between the current state and the target state of the operating machinery for an operator.

It should be noted that the numerical information can be the working parameters, or the difference value between the working parameters and the target parameters. The operator can obtain current state of the operating machinery in real time through the numerical information. Accuracy of the numerical information can be adjusted according to the actual operation site or can be preset accuracy.

When the numerical information represents the difference value between the working parameters and the target parameters, the numerical value can be negative, which means that the current working parameters are less than the target parameters.

The image information is a figurative representation of the difference degree. The distribution track of the image can be distributed along a certain direction or can be distributed around a certain point.

When the distribution range of the image increases or decreases on the distribution track, the difference degree can be characterized by the distribution range of the image. For example, the level of the difference degree can be characterized by the length of the long strip extending along a certain direction, and the level of the difference degree can also be characterized by the size of the central angle of a sector with a point as the center. In this way, the difference degree information is transformed into length information or angle information. Compared with direct numerical expression, this information expression mode is more intuitive and can guide the operator more efficiently.

It should be noted that the distribution along a certain direction can be an extension along a straight line, or can be an extension along a broken line or curve. The distribution around a certain point is not limited to the shape distribution along a perfect circle, and it can be the shape distribution along an ellipse or other simple graphics with a center, such as the spatial distribution along the shape of a rectangle, trapezoid or spiral.

In the process of increasing and decreasing distribution along the track, it can be a continuous increasing and decreasing distribution when observed by naked eyes, or it can be a discrete increasing and decreasing distribution when observed by naked eyes.

For the change amount of each increase or decrease in the process of distribution along the track, it can be a change of one or more identical image units, or it can also be a change of one or more different image units.

In other words, the distribution along a certain direction and the distribution around a certain point only represent an image distribution on a straight line or curve.

The correlation between image information and difference degree can be related to shape or color. For example, image color shade, image color combination, image size, image shape (such as a sector with different central angles) or image length can be used to represent the level of the difference degree.

Associating the difference degree with the image not only satisfies the intuitiveness of information expression, but also effectively assists the operator to proceed to the next step.

In an embodiment of the present application, the difference degree can be the difference value between the working parameters and the target parameters. The difference degree between the current working parameters and the target parameters is marked by the length of the color block displayed in a strip shape, and the difference degree is updated in real time based on the operator's operation.

In step 130, the numerical information is displayed in a first display area of a windshield of the operating machinery, and the image information is displayed in a second display area of the windshield.

It should be noted that, in the prior art, some parameter information is directly displayed on the operation panel, so a driver needs to disperse some of his energy from the front mechanism to observe the operation panel, and manually determine the difference degree between the current parameters and the target parameters to guide his own operation. This method of operation is prone to danger.

In the embodiment of the present application, by directly displaying the working parameters and the image information after image processing at the windshield, the operator can keep observing the mechanism and the external environment, and can clearly know the current working parameters and understand the next step through peripheral vision.

Combining the image information and the numerical information not only helps the operator to quickly and intuitively know the key information of the operating machinery, but also helps the operator to proceed to accurate operation.

Figure 2:
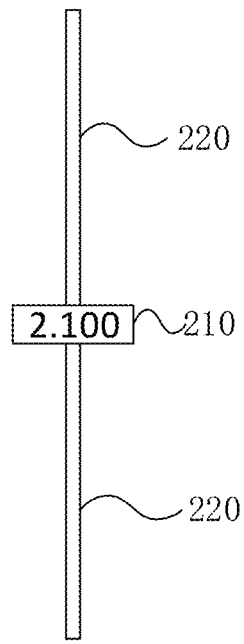
FIG. 2 is a display area diagram of an auxiliary display method for operating machinery according to the present application.

In one embodiment of the present application, as shown in FIG. 2, a first display area 210 displays the numerical information, and a second display area 220 displays the image information.

In the display areas, the deviation between the current working parameters and the target parameters can be characterized by the length of the color block displayed in a strip shape. It should be noted that the distribution along a certain direction is not limited to the continuous rectangle in the figure, and can also be a combination of discrete geometric shapes.

In actual execution, the display area is not limited to the form in the figure. For example, the length of the display area can be extended in any direction, and is not limited to the vertical extension in the figure; the relative positional relationship between the first display area and the second display area is not limited to the fact that the first display area is in the center of the second display area; and the shapes of the first display area and the second display area are not limited to rectangles, but may also be circles, ellipses, diamonds, and the like.

It should be noted that in some embodiments, image information can further be represented by sector color blocks. Selecting a radius of the sector as a fixed edge, and the difference degree between the current working parameters and the target parameters is characterized by the angle of sector.

In one embodiment of the present application, the display area can include two concentric circles. The first display area can overlap with the circle with relatively small radius in the two concentric circles, and the second display area can overlap with the ring formed by the two concentric circles. The form of concentric circles can be continuous rings or a combination of discrete sectors.

In step 130, a plurality of ways can be used to display the above-mentioned numerical information and image information on the windshield, and the plurality of ways include but are not limited to: lamp belts (such as LED lamps), display screens of various colors, projections, and the like.

Representing the difference degree as image information not only helps the operator to quickly and intuitively know the key information of the operating machinery, but also can be used to guide the operator's next operation.

The auxiliary display method for operating machinery according to the embodiment of the present application, by displaying the numerical information of the current working parameters and the image information of the difference degree between the current working parameters and the target parameters on the windshield of the operating machinery respectively, helps the operator to obtain key information more efficiently and conveniently, so as to directly guide the operator's next operation and enhance the safety during operation.

In some embodiments of the present application, as shown in FIG. 3 to FIG. 4 and FIG. 6 to FIG. 7, the image information is displayed in the second display area with a target length, where the target length is related to the absolute value of the difference degree.

It should be noted that when the second display area extends along a certain track, the difference degree can be characterized by the length of the image distribution. The image information is displayed within the target length in the extension direction of the second display area, so that the image information can be displayed in the form of the target length.

The distribution track of the second display area can be on a straight line, or can be on a broken line or a curve. The distribution can be continuous or discrete.

The target length is determined by the absolute value of the difference degree, and if the corresponding relationship between the two is expressed by a function, the function is piecewise monotone in the absolute value range of the difference degree. The function can conform to a power function, and can also saturate after the absolute value of the difference degree is greater than a certain value.

It should be noted that the absolute value of the difference degree is taken as an independent variable, and the target length is taken as a dependent variable. The two are not limited to the corresponding relationship of elementary functions, but can also be piecewise functions.

Optionally, in the region with smaller absolute value of the difference degree, the target length is greatly affected by the absolute value of the difference degree, and in the region with larger absolute value of the difference degree, the target length is little or not affected by the absolute value of the difference degree.

Accurate arrival of the target parameters is mainly concerned during the operation of the operating machinery, so that the impact on the target length can be reduced when the absolute value of the difference degree is larger, and the impact on the target length can be amplified when the absolute value of the difference degree is smaller, so as to improve the accuracy of operator's operation.

Figure 3:
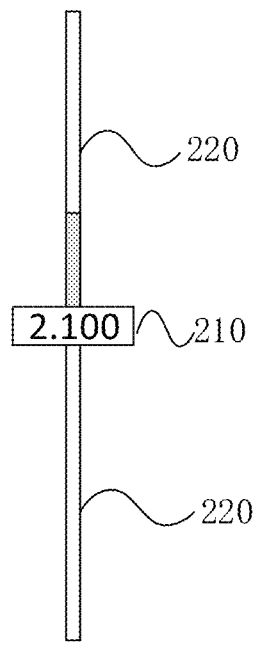
FIG. 3 is a second display area diagram of an auxiliary display method for operating machinery according to the present application.
Figure 4:
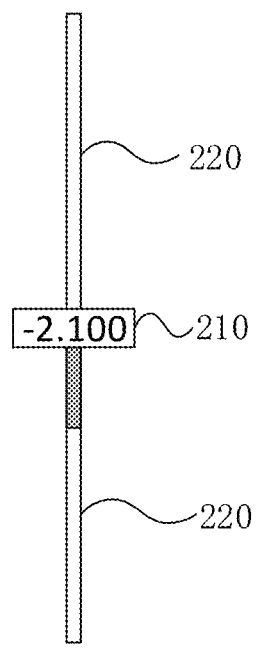
FIG. 4 is a third display area diagram of an auxiliary display method for operating machinery according to the present application.

In one embodiment of the present application, as shown in FIG. 3 to FIG. 4, the absolute value of the vertical distance between the current bucket tooth tip of the excavator and the reference point can be related to the length of the striped color block.

In the graph of the functional relationship between the absolute value of the vertical distance between the current bucket tooth tip and the reference point of the excavator and the length of the striped color block, two critical points can be used to divide the corresponding relationship into three segments of linear function corresponding relationship. In the region with smaller absolute value of the vertical distance between the current bucket tooth tip and the reference point of the excavator, the slope of the function is 2, and in the region with larger absolute value of the vertical distance between the current bucket tooth tip and the reference point of the excavator, the slope of the function is 0.5, and in the middle region, the slope of the function is 1.

In FIG. 3, the absolute value of the current vertical distance between the bucket tooth tip of the excavator and the reference point can be 2.100. When the absolute value decreases, the length of the color block in the figure (that is, the target length) can be correspondingly reduced; when the absolute value increases, the length of the color block (that is, the target length) in the figure can be correspondingly increased.

Figure 6:
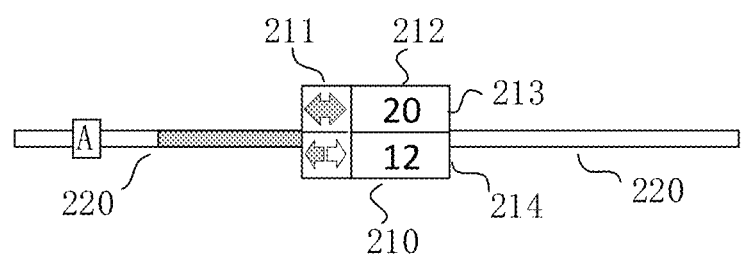
FIG. 6 is a fifth display area diagram of an auxiliary display method for operating machinery according to the present application.
Figure 7:
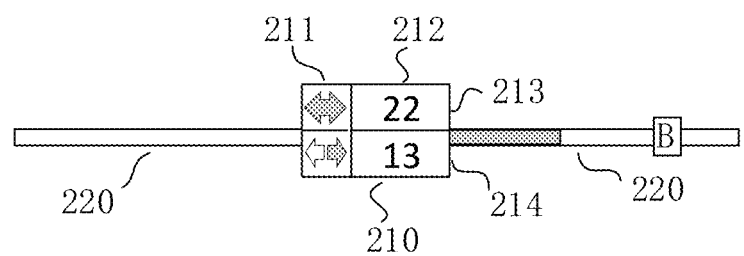
FIG. 7 is a sixth display area diagram of an auxiliary display method for operating machinery according to the present application.

In one embodiment of the present application, as shown in FIG. 6 and FIG. 7, the difference value between the current rotation angle of the excavator and the target rotation angle can represent the difference degree. The first display area 210 can be a rectangular electronic display, and the current rotation angle of the excavator with the color block of the target length can be characterized in the second display area 220, and the length of the color block is proportional to the current rotation angle of the excavator.

It can be understood that as the current rotation angle of the excavator increases, the difference value between it and the target rotation angle changes accordingly. When the current rotation angle of the excavator is less than the target rotation angle, the length of the color block in the second display area 220 is inversely proportional to the absolute value of the difference degree; when the current rotation angle of the excavator is greater than the target rotation angle, the length of the color block in the second display area 220 is proportional to the absolute value of the difference degree.

In other words, when the difference degree is negative, the target length is inversely proportional to the absolute value of the difference degree; when the difference degree is positive, the target length is proportional to the absolute value of the difference degree.

The corresponding relationship between the two is expressed as a function, and the function is piecewise monotonic in the absolute value range of the difference degree. Therefore, the impact on the change of image information when the absolute value of difference is small can be amplified, so that the operator can achieve high accuracy operation requirements according to the image information when near the target parameter.

In the above embodiments, the numerical information is integrated into the image by associating the absolute value of the difference degree with the length of the image, and the intuitive display of specific information is realized by the simplified image. The operator can learn the next operation only based on the length of the image display, without manually reading two values of the same type of parameters and comparing and calculating them.

In some embodiments of the present application, as shown in FIG. 3 and FIG. 4 and FIG. 6 to FIG. 7, the image information is displayed in the second display area on a first side of the first display area when the working parameters are less than the target parameters; and the image information is displayed in the second display area on a second side of the first display area when the working parameters are greater than the target parameters.

It should be noted that the first side and the second side of the first display area represent that the second display area has different orientation relative to the first display area, which does not mean that the respective extension directions of the first side and the second side must be located in a straight line, nor does it mean that the second display area must be distributed along a straight line on both sides of the first display area.

In one embodiment of the present application, as shown in FIG. 3 and FIG. 4, the length of the striped color block represents a current horizontal extension distance of the bucket tooth tip from the reference point, and the second display area 220 on both sides of the first display area 210 is located on a straight line.

The first display area 210 can be a LED monitor, which displays numerical information, and the numerical information can represent the difference value between the current working parameters and the target parameters. The second display area 220 can be a lamp belt, which is composed of LED lamps, and the length of the turned-on lamps in the lamp belt can characterize the magnitude of the difference degree.

A side of the second display area 220 close to the first display area 210 is taken as a fixed end, and the target length is extending from the fixed end to a side distal to the first display area 210 to display image information. The target length is proportional to the absolute value of the difference degree.

In the actual operating process, when the current bucket tooth tip is farther than the reference point in the horizontal direction, as shown in FIG. 3, the number in the first display area 210 is positive, and the second display area 220 above displays the first color with the target length (shadow area).

When the current bucket tooth tip is closer than the reference point in the horizontal direction, as shown in FIG. 4, the number in the first display area 210 is negative, and the second display area 220 below displays the second color with the target length (shadow area).

In an embodiment of the present application, as shown in FIG. 6, the first display area 210 is a rectangular electronic display, and the second display area 220 is a lamp belt composed of LED lamps. The length of the opened LED lamps in the lamp belt is used to characterize the magnitude of the difference degree.

The second display area 220 on the left side of the first display area 210 represents that in view of the operator's operating position, relative to the front of the excavator, there is a rotation angle to the left of 0-180 degrees; and the second display area 220 on the right of the first display area 210 represents that in view of the operator's operating position, relative to the front of the excavator, there is a rotation angle to the right of 0-180 degrees.

Referring to the arrangement of LED lamps at the second display area 220, a lampshade can be arranged outside the LED lamps to form a continuous lamp strip when observed by naked eyes. The LED lamps can also be distributed as discrete color blocks when observed by naked eyes, and the increasing of the target length is displayed by the gradual lighting of the color blocks. By quantifying the target length as the number of lighted color blocks, the display of information is more intuitive.

In other embodiments, the difference degree can be expressed in the form of the sector-shaped color block in a circle. The central angle corresponding to the sector-shaped color block is related to the absolute value of the difference degree.

In an embodiment of the present application, the orientation of a certain radius in the circle can be used as a starting angle, and the sector of the target angle can be intercepted on the circumference of the sector graph, and the target angle is proportional to the absolute value of the difference degree.

When the working parameters are greater than the target parameters, a sector with the target angle can be intercepted from the second display area 220 which is starting from the starting angle of the sector graph and within the range of 0-180 degrees in the counterclockwise direction, and the sector area displays the first color.

When the working parameters are less than the target parameters, a sector with the target angle can be intercepted from the second display area 220 which is starting from the starting angle of the sector graph and within the range of 0-180 degrees in the clockwise direction, and the sector area displays the second color.

It should be noted that the first color/second color mainly expresses the information displayed in color. The first color/second color can be a single color or a collection of a plurality of colors, and can be distinguished from other parts of the second display area. The first color can be distinguished from the second color.

The first color/second color can also change over time. For example, a flowing lamp effect is displayed.

It should be noted that providing different colors on both sides of the first display area enables the operator to quickly judge the numerical relationship between the current working parameters and the target parameters with only peripheral vision, and assists the operator to quickly and qualitatively determine the next operation. For example, the determination of the direction of excavator rotation, and whether to raise or reduce the crane lifting speed.

In the above embodiments, based on the different magnitude relationship between the working parameters and the target parameters, the images are displayed on both sides of the first display area to realize the correlation between the orientation information and the magnitude information, which is convenient for the operator to intuitively grasp the information.

Figure 5:
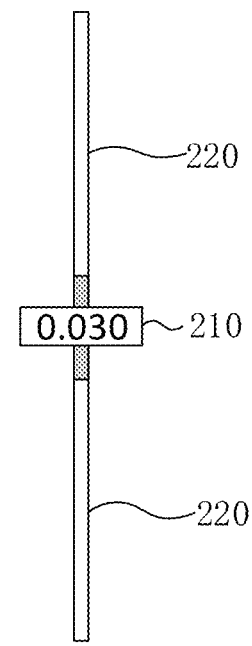
FIG. 5 is a fourth display area diagram of an auxiliary display method for operating machinery according to the present application.

In some embodiments of the present application, as shown in FIG. 5, the prompt information is output when the difference degree is less than the target value. Where the target value is an allowable error in the operation process. When the difference degree between the working parameters and the target parameters is less than the target value, the operation specification or the target accuracy of the task are achieved.

The target value can be a fixed value manually set, or can be a value obtained after data processing through certain algorithms.

The prompt information includes one or more of the following modes: the numerical value in the first display area 210 flickers or changes color; the image in the second display area 220 flickers or changes color; the second display area 220 displays the image symmetrically, and emits a sound prompt.

In one embodiment of the present application, as shown in FIG. 5, the first display area 210 is a lamp belt, and the target value can be 0.100.

After operation, the current difference degree is 0.030, which has reached the operation specification of the work or target accuracy of the task. The second display area 220 displays the third color symmetrically, as shown by the shadow part in FIG. 5, that is, the second display area 220 displays the image symmetrically.

It should be noted that the first color, the second color and the third color mainly express information displayed in color. The first color, the second color or the third color can be a single color, or a collection of a plurality of colors, and can be distinguished from the other parts of the second display area. The three colors can be different from each other.

The above-mentioned colors can also change over time. For example, a flow lamp effect is displayed.

In the above-mentioned embodiment, when the target parameters are reached, the operator is assisted by prompt information to judge the status quo, so as to optimize the user experience.

On the basis of the above-mentioned embodiments, the working parameters of the operating machinery can include extension parameters and height parameters, which facilitates the operator's quick determination of the horizontal and vertical distance between the current state and the target point during the actual operation process of the operating machinery, so as to proceed to subsequent operations.

It should be noted that the extension parameters are the working parameters and target parameters of the operating machinery in the horizontal direction, and the height parameters are the working parameters and target parameters of the operating machinery in the vertical direction. For example, the height of the current bucket tooth tip from the reference point in the excavator, and the horizontal extension distance of the current bucket tooth tip from the reference point.

In some of the embodiments of the present application, as shown in FIG. 6 and FIG. 7, the reference identifier is displayed at the target position in the second display area based on the target parameters, and the second display area includes two segments on both sides of the first display area. In the second display area, the image information is displayed in the target color, and the distance from the image information to the reference mark is positively correlated with the absolute value of the difference degree. Where the working parameters include rotation angle parameters.

It should be noted that the target position can be a position of the strip shaped color block representing the image information in the second display area when the current working parameter reaches the target parameter.

The reference mark at the target position can be a color block distinguished from the second display area, for example, the color block A that overlaps with the striped color block in the second display area 220 in FIG. 6; and it can also be an image pointing to the target position with pointing information, such as a triangle mark, an arrow mark or a finger mark outside the striped color blocks in the second display area 220.

When the angle parameters are involved in the state change or curve motion of the operating machinery, the reference mark is used to assist the operator to adjust the current working parameters to the target parameters, so that the operator can grasp the current angle information in real time.

The second display area has two segments and located on both sides of the first display area, which means that the two segments of the second display area have different orientations relative to the first display area, and does not mean that the respective extension direction of the two segments in which the second display area is divided must be located on the same straight line, nor does it mean that the second display area must be distributed along a straight line on both sides of the first display area.

The second display area is divided into two sections by the first display area, and the operator is assisted to quickly determine the magnitude relationship between the current working parameters and the target parameters or the next adjustment direction based on the two sides of the first display area.

The target color represents that the image information is different from other regions of the second display area, which does not mean that the target color displayed on both sides of the first display area must be the same. The target color can be a single color or a collection of a plurality of colors.

Positive correlation means: taking the absolute value of the difference degree as the independent variable, and taking the distance between the image information and the reference mark as the dependent variable, the function image of the two is monotonically increasing. For example, the relationship between the two conforms to a proportional function. When the absolute value of the difference degree is small, the influence of the absolute value of the difference degree on the distance from the image information and the reference mark can also be increased.

The distance from the image information to the reference mark is set to be positively correlated with the absolute value of the difference degree, which is in line with the actual perception of the operator for the angle parameters during the angle regulation process.

Rotary angle parameter is the angle parameter involved in the state change or curve motion of the operating machinery. For example, the rotation angle of the excavator, the body roll angle of the excavator, the angle of the crane, and the like.

It should be noted that the first display area can include a mark area and a numerical area. In this way, different information can be displayed simultaneously in the first display area, and the types of information can be distinguished by different identifiers displayed in the mark area.

In one embodiment of the present application, as shown in FIG. 6 and FIG. 7, the rotation angle information of the excavator is displayed. The first display area 210 can be a rectangular electronic display, and the rectangular electronic display can include a mark area 211 and a numerical area 212. The second display area 220 can represent the difference degree through strip shaped color blocks.

The second display area 220 on the left side of the rectangular electronic display can represents that: in view of the operator's operating position, relative to the front of the excavator, there is a rotation angle to the left of 0-180 degrees. The second display area 220 on the right side of the rectangular electronic display can represents that: in view of the operator's operating position, relative to the front of the excavator, there is a rotation angle to the right of 0-180 degrees.

As shown in FIG. 6 and FIG. 7, the first display area 210 includes a target parameter display area 213 and a working parameter display area 214. The working parameter display area 214 is configured to display the current rotation angle of the excavator, and the target parameter display area 213 is configured to display the target rotation angle of the excavator.

The mark area 211 of the target parameter display area 213 and the working parameter display area 214 can be different from each other, which forms the basis for distinguishing.

FIG. 6 and FIG. 7 only show the relative positions of the mark area 211 and the numerical area 212, as well as the relative positions of the target parameter display area 213 and the working parameter display area 214. In the actual execution, the relative position can be appropriately deformed.

In practice, the target color can be displayed in a striped color block of the second display area 220 on one of both sides of the first display area 210, as shown in the shadow area of the second display area 220 in FIG. 6 and FIG. 7.

FIG. 6 shows a left rotation process. The reference mark can be a rectangular A different from the second display area 220, the target parameter can be 20, and the current working parameter is 12. During the operator's operation, the striped color blocks in the second display area 220 gradually approach the rectangle A, and the distance therebetween decreases accordingly.

FIG. 7 shows a right rotation process. The reference mark can be a rectangular B different from the second display area 220, the target parameter can be 22, and the current working parameter is 13. During the operator's operation, the striped color block in the second display area 220 gradually approaches the rectangle B, and the distance therebetween decreases accordingly.

In other words, when the current rotation angle approaching the rotation angle of the target, the distance between the striped color block in the second display area 220 and the reference mark is getting smaller and smaller.

When the absolute value of the difference between the working parameters and the target parameters is less than the target value, the prompt information is output, and the rotary auxiliary is completed at this time.

In the above-mentioned embodiments, when the angle parameters are involved in the state change or curve motion of the operating machinery, the reference mark is used to assist the operator to adjust the current working parameters to the target parameters, so that the operator can grasp the current angle information in real time. The distance from the image information to the reference mark is set to be positively correlated with the absolute value of the difference degree, which is in line with the actual perception of the operator for the angle parameters in the angle regulation process.

In some embodiments of the present application, the target parameters and current working parameters are displayed in the first display area when the rotary auxiliary mode is turned on; and the roll angle and pitch angle are displayed in the first display area when the rotary auxiliary mode is turned off.

Figure 8:
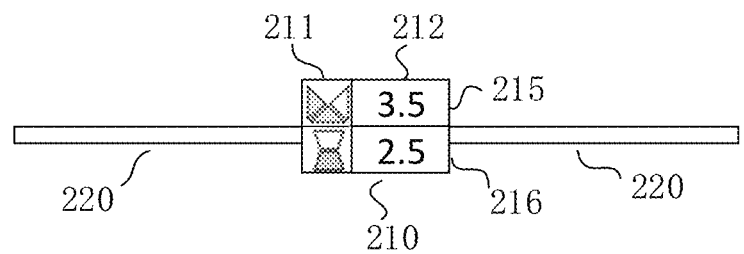
FIG. 8 is a seventh display area diagram of an auxiliary display method for operating machinery according to the present application.

In an embodiment of the present application, on the basis of the embodiments mentioned above in FIG. 6 and FIG. 7, different working modes can also be provided. As shown in FIG. 6 to FIG. 8, under different modes, different marks can be displayed in the mark area 211, and data corresponding to the mark on the left side of the numerical area 212 can be displayed.

When the rotary auxiliary mode is opened, as shown in FIG. 6 and FIG. 7, the first display area 210 can include the target parameter display area 213 and the working parameter display area 214.

After the rotary assist mode is turned off, as shown in FIG. 8, the first display area 210 can include a roll angle display area 215 and a pitch angle display area 216, so as to assist the operator in completing the state adjustment of the operating machinery.

It should be noted that the rotary auxiliary can be automatically turned off after several seconds after sending the prompt information; or it can be automatically turned off after satisfying the turn-off condition according to the actual situation; or a manual turn-off mode can be set to ensure the operator's participation during operation of operating machinery, or to allow the operator to choose the function.

In the case of opening and closing the auxiliary mode, the first display area 210 can display different information through different icons, which expands the diversity of information and realizes the intuitive and convenient reading of various information.

In the above embodiments, the roll angle and pitch angle are displayed after the rotary auxiliary mode is closed, and the actual working condition of the operating machinery is fully considered to conform to the operation sequence of the operator.

Based on the above embodiments, the following embodiments are described for excavators.

Figure 9:
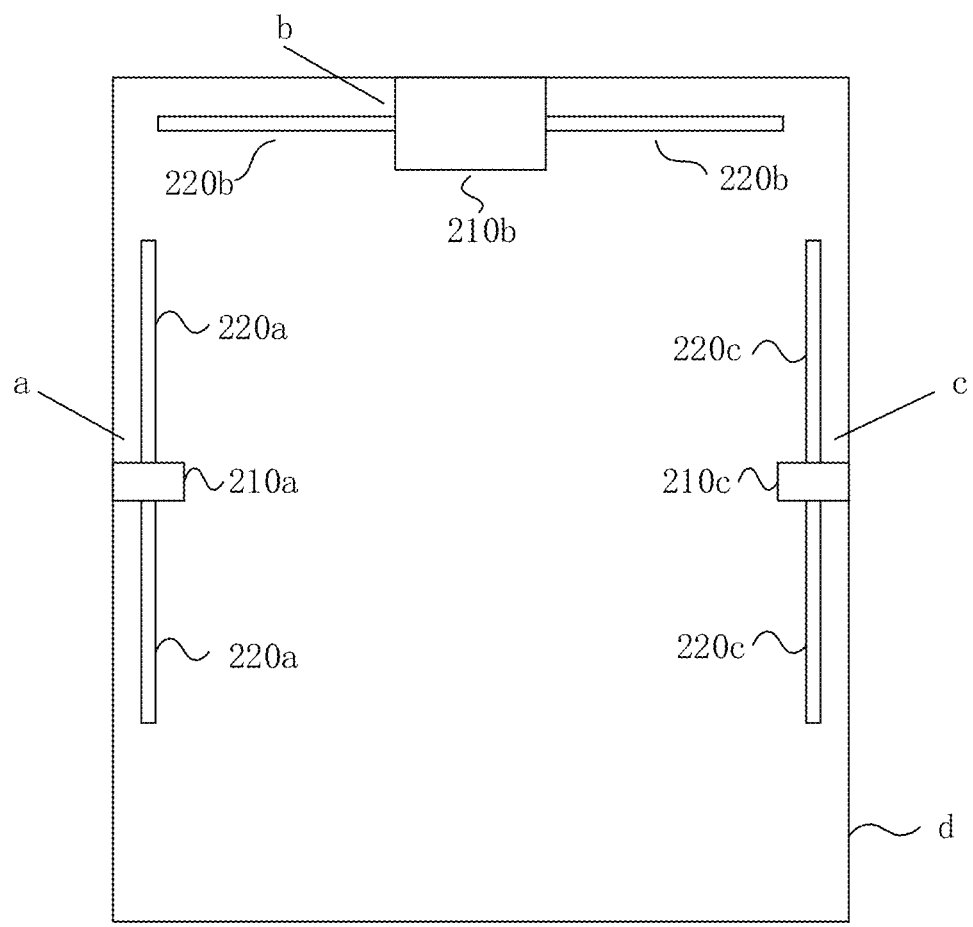
FIG. 9 is an eighth display area diagram of an auxiliary display method for operating machinery according to the present application.

In one embodiment of the present application, as shown in FIG. 9, a height information display area a and an extension information display area c can be located on both sides of the windshield d of the excavator and extend along the vertical direction respectively. A rotary auxiliary/state information display area b can be located on the upper part of the windshield d of the excavator and extend along the horizontal direction.

Each of the three has a distance to the nearest edge of the windshield d of 0 mm -200 mm, a height to the bottom of the windshield d of 0 mm-800 mm, a length of the extension direction of 50 mm-1500 mm, and a width of a lamp belt of 1 mm-100 mm.

The distribution of the three is helpful for the operator to know the difference degree between the current working parameters and the current working parameters and the target parameters through the peripheral vision while maintaining observation of the mechanism and the external environment, so as to proceed to the next operation.

The three can be expressed the difference degree by the length of the striped color block. The first display areas of the three can be rectangular electronic displays, and the second display area can be narrow lamp belts close to both sides of the first display areas.

Based on human visual habits, in the height information display area a, the second display area above the first display area can represent that the current height of the bucket is higher than the reference point in the vertical direction, and the second display area below the first display area can represent that the current height of the bucket is lower than the reference point in the vertical direction.

In the rotation assistance/state information display area b, the second display area on the left side of the first display area can represent that in view of the operator's operating position, relative to the front of the excavator, there is a rotation angle to the left of 0-180 degree. The second display area on the right side of the first display area can represent that in view of the operator's operating position, relative to the front of the excavator, there is a rotation angle to the right of 0-180 degree. Rotary auxiliary/state information display area b is set in line with the operator's spatial orientation perception, which facilitates the operator to focus on the mechanism and the external environment and increases the safety of the operation process.

In the extension information display area c, the second display area above the first display area can represent that the current extension position of the bucket is farther than the reference point in the horizontal direction, and the second display area below the first display area can represent that the current extension position of the bucket is closer than the reference point in the horizontal direction.

The upper and middle parts of the windshield d of the excavator display height information, rotary auxiliary/state information and extension information at the same time, which facilitates the operator to obtain the current key information of the excavator while completing operation.

The height information display area a and the extension information display area c can be referred to embodiments of FIG. 3 to FIG. 5, and the rotary auxiliary/state information display area b can be referred to embodiments of FIG. 6 to FIG. 8.

It should be noted that the height information display area a and the extension information display area b are independent of each other, and the color matching of the first color, the second color and the third color of the two are not necessarily the same. For example, in the height information display area a, the first color is yellow, the second color is red, and the third color is green; and in the extension information display area b, the first color is red, the second color is green, and the third color is yellow.

It should be noted that when the third color in the height information display area a and the extension information display area b is the same, the complexity of the information received by the operator during the work process can be reduced, and the operator can focus more on the field work.

The auxiliary display device for operating machinery provided in the present application is described below, and the mentioned-below auxiliary display device for operating machinery and the mentioned-above auxiliary display method for operating machinery may refer to each other correspondingly.

Figure 10:
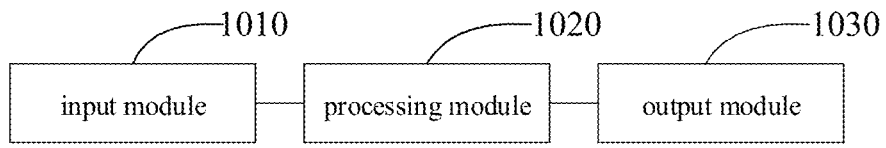
FIG. 10 is a structural diagram of an auxiliary display device for operating machinery according to the present application.

As shown in FIG. 10, the present application further provides an auxiliary display device for operating machinery, which includes an input module 1010, a processing module 1020 and an output module 1030.

The input module 1010 is configured to obtain current working parameters and target parameters of the operating machinery.

The processing module 1020 is configured to calculate a difference degree between the working parameters and the target parameters.

The output module 1030 is configured to generate numerical information used to characterize the working parameters and image information used to characterize the difference degree between the working parameters and target parameters, and output the numerical information to a first display area on a windshield, and output the image information to a second display area on the windshield.

It should be noted that the difference degree between the current working parameters and the target parameters is obtained by the input module 1010, which realizes the selection of key information and helps the operator to quickly know the difference between the current state and the target state of the operating machinery.

In the above embodiments, by obtaining the difference degree between the current working parameters and the target parameters, the selection of the key information is realized, which helps the operator quickly obtain the gap between the current state and the target state of the operating machinery.

By displaying the numerical information of the current working parameters and the image information of the difference degree between the current working parameters and the target parameters on the windshield of the operating machinery, the efficiency and convenience of the operator when obtaining the key information is realized, and the safety of the working process is enhanced.

In some embodiments of the present application, the output module 1030 is further used to display the image information in the second display area with the target length, and the target length is related to the absolute value of the difference degree.

In the above embodiments, the numerical information is integrated into images by associating the absolute value of the difference degree with the length of the image, and the intuitive display of specific information is realized by simplifying the image. The operator can learn the next operation only by the length displayed by the image, without manually reading two values of the same type of parameters and comparing and calculating them.

In some embodiments of the present application, the output module 1030 is further configured to output the prompt information when the difference degree is less than the target value.

In the above embodiments, when the target parameters are reached, the operator is assisted by prompt information to determine the status quo and optimize the user experience.

In some embodiments of the present application, the output module 1030 is further configured to display the image information in the second display area on the first side of the first display area when the working parameters are less than the target parameters; and display the image information in the second display area on the second side of the first display area when the working parameters are greater than the target parameters.

The working parameters include extension parameters and height parameters.

It should be noted that the extension parameters are the working parameters and target parameters of the operating machinery in the horizontal direction, and the height parameters are the working parameters and target parameters of the operating machinery in the vertical direction. For example, the current height of the bucket tooth tip from the reference point in the excavator, and the current horizontal extension distance of the bucket tooth tip from the reference point. The reference point can be located on the target slope.

In the above embodiment, based on the different magnitude relationship between the working parameters and the target parameters, the images are displayed on both sides of the first display area to realize the correlation between the orientation information and the magnitude information, which is convenient for the operator to intuitively grasp the information.

In some embodiments of the present application, the output module 1030 is further configured to display a reference mark at a target position of the second display area based on the target parameters, and the second display area includes two segments on both sides of the first display area; and displaying the image information in a target color in the second display area, and distance from the image information to the reference mark is positively correlated with the absolute value of the difference degree.

The working parameters include rotation angle parameters.

It should be noted that the rotation angle parameters are the angle parameters involved in the state change or curve motion of the operating machinery. For example, the rotation angle of the excavator, the body roll angle of the excavator, the angle of the crane, and the like.

In the above-mentioned embodiments, when the angle parameters are involved in the state change or curve motion of the operating machinery, the reference mark is used to assist the operator to adjust the current working parameters to the target parameters, so that the operator can grasp the current angle information in real time. The distance from the image information to the reference mark is set to be positively correlated with the absolute value of the difference degree, which is in line with the actual perception of the operator for the angle parameters in the angle regulation process.

In some embodiments of the present application, the output module 1030 is further configured to display the target parameters and the current working parameters in the first display area when the rotary auxiliary mode is turned on; and the roll angle and pitch angle are displayed in the first display area when the rotary auxiliary mode is turned off In the above embodiments, the roll angle and pitch angle are displayed after the rotary auxiliary mode is turned off, and the actual working condition of the operating machinery is fully considered to conform to the operation sequence of the operator.

According to the auxiliary display device for operating machinery provided in the present application, through obtaining difference degree information and displaying the combination of numerical information and image information, the selection of key information and the intuitiveness and clarity of the display of key information are realized, while enhancing the safety of operation process is enhanced.

The present application further provides an auxiliary display system for operating machinery, which includes an information acquisition device, a windshield, a display device and a controller.

The information acquisition device is configured to collect current working parameters of the operating machinery.

It should be noted that the working parameters are the current monitored parameters of the various power mechanisms or executing mechanisms of the operating machinery, and different operating machinery may have different working parameters.

For example, when the operating machinery is an excavator, the working parameters may include at least part of the followings: a current height of a bucket tooth tip from a reference point, a current horizontal extension distance of the bucket tooth tip from the reference point, a current rotation angle, a body roll angle and a body pitch angle. The reference point can be located on the target slope.

For other operating machinery, such as a crane, the working parameters may include at least part of the following part: quality of lifting material, a lifting speed, a horizontal position, angle, amplitude and percentage of torque.

The above-mentioned working parameters can be collected through information acquisition devices (such as various sensors provided on the operating machinery) and transmitted to the controller of the operating machinery.

The windshield includes a first display area and a second display area.

The controller are electrically connected with the information acquisition device and the display device, and are configured to control the display device to output numerical information used to characterize working parameters and image information used to characterize a difference degree between the working parameters and target parameters based on the target parameters and the working parameters of the operating machinery; and display the numerical information in the first display area and display the image information in the second display area.

It should be noted that the target parameters include a target position and a target state of the operating machinery, which corresponds to a target value to be achieved by the above-mentioned working parameters.

In other words, the target parameters are used to characterize a target position or a target state that a certain mechanism of the operating machinery needs to reach or be adjusted to.

The difference degree can be measured by mathematical methods, and can be a difference between the working parameters and the target parameters or a ration of the working parameters to the target parameters.

The difference degree between the working parameters and the target parameters is used to characterize the difference between the two types of parameters, such as a current height of a bucket tooth tip of the excavator from a reference point, and a ratio of the current lifting speed of the crane to the preset lifting speed of the crane.

It should be noted that the comparison of the difference degree is aimed at the same parameter of the same mechanism. For example, for an excavator, the comparison is performed between a current rotation angle and a target rotation angle; and for a crane, the comparison is performed between a current horizontal position of material and a target horizontal position of the material.

It should be noted that the numerical information can be the working parameters themselves, or the difference value between the working parameters and the target parameters. The operator can obtain the current state of the operating machinery in real time through the numerical information. Accuracy of the numerical information can be adjusted according to the actual operation site or can be preset accuracy.

When the numerical information represents the difference value between the working parameters and the target parameters, the numerical value can be negative, which means that the current working parameters are less than the target parameters.

The image information is a figurative representation of the difference degree. The distribution track of the images can be distributed along a certain direction or can be distributed around a certain point.

When the distribution range of the images increases or decreases on the distribution track, the difference degree can be characterized by the distribution range of the image. For example, the level of the difference degree can be characterized by the length of the long strip extending along a certain direction, and the level of the difference degree can also be characterized by the size of the central angle of a sector with a point as the center. In this way, the difference degree information is transformed into length information or angle information. Compared with direct numerical expression, this information expression mode is more intuitive and can guide the operator more efficiently.

It should be noted that the distribution along a certain direction can be an extension along a straight line, or an extension along a broken line or curve. The distribution around a certain point is not limited to the shape distribution along positive perfect circle, and it can be the shape distribution along an ellipse or other simple graphics with a center, such as the spatial distribution along the shape of a rectangle, trapezoid or spiral In the process of increasing and decreasing distribution along the track, it can be a continuous increasing and decreasing distribution when observed by naked eyes, or it can be a discrete increasing and decreasing distribution when observed by naked eyes.

For the change amount of each increase or decrease in the process of track distribution along the track, it can be a change of one or more identical image units, or it can also be a change of one or more different image units.

In other words, the distribution along a certain direction and the distribution around a certain point only represent an image distribution on a straight line or curve.

The correlation between image information and difference degree can be related to shape or color. For example, image color shade, image color combination, image size, image shape (such as a sector with different central angles) or image length can be used to represent the level the difference degree.

Associating the difference degree with the image not only satisfies the intuitiveness of information expression, but also effectively assist the operator to proceed to the next step.

It should be noted that, in the prior art, only some parameter information is directly displayed on the operation panel, so a driver needs to disperse some of his energy from the front mechanism to observe the operation panel, and manually determines the difference between the current parameters and the target parameters to guide his own operation. This method of operation is prone to danger.

In the embodiment of the present application, by directly displaying the working parameters and the image information after image processing at the windshield, the operator can keep the observing the mechanism and the external environment, and can clearly know the current working parameters and understand the next step through peripheral vision.

Representing the difference degree as image information not only helps the operator to quickly and intuitively know the key information of the operating machinery, but also can be used to guide the operator's next operation.

In an embodiment of the present application, as shown in FIG. 2, the first display area 210 displays the numerical information, and the second display area 220 displays the image information.

In the display areas, the deviation between the current working parameters and the target parameters can be characterized by the length of the color block displayed in a strip shape. It should be noted that the distribution along a certain direction is not limited to the continuous rectangle in the figure, and can also be a combination of discrete geometric shapes.

In actual execution, the display area is not limited to the form in the figure. For example, the length of the display area can be extended in any direction, and is not limited to the vertical extension in the figure; the relative positional relationship between the first display area and the second display area is not limited to the fact that the first display area is in the center of the second display area; and the shapes of the first display area and the second display area are not limited to rectangles, but may also be circles, ellipses, diamonds, and the like. In one embodiment of the present application, the display area can include two concentric circles. The first display area can overlap with the circle with relatively small radius in the two concentric circles, and the second display area can overlap with the ring formed by the two concentric circles. The form of concentric circles can be a continuous ring or a discrete sector combination.

In the above-mentioned embodiments, by displaying the numerical information of the current working parameters and the image information of the difference degree between the current working parameters and the target parameters on the windshield of the operating machinery, the efficiency and convenience of the operator when obtaining the key information are realized, and the safety of the working process is enhanced.

In some of the embodiments of the present application, as shown in FIG. 3 and FIG. 4, the display device includes a display screen and a lamp belt on both sides of the display screen. The display screen is provided in the first display area, and the lamp belt is provided in the second display area.

It should be noted that, the image information can be displayed in the second display area on a first side of the first display area when the working parameters are less than the target parameters; and the image information can be displayed in the second display area on a second side of the first display area when the working parameters are greater than the target parameters.

It should be noted that the first side and the second side of the first display area represent that the orientation of the second display area has different orientation relative to the first display area, which does not mean that the extension directions of the first side and the second side must be located in a straight line, nor does it mean that the second display area must be distributed along a straight line on both sides of the first display area.

In one embodiment of the present application, as shown in FIG. 3 and FIG. 4, the length of the striped color block represents the current horizontal extension distance of the bucket tooth tip from the reference point, and the second display area 220 on both sides of the first display area 210 is located on a straight line.

The first display area 210 can be LED display, which displays numerical information, and the numerical information can represent the difference value between the current working parameters and the target parameters. The second display area 220 can be a lamp belt, which is composed of LED lamps, and the length of the turned-on lamps in the lamp belt can characterize the magnitude of the difference degree.

A side of the second display area 220 close to the first display area 210 can be taken as a fixed end, and the target length is extending from the fixed end to a side distal to the first display area 210 to display image information. The target length can be proportional to the absolute value of the difference degree.

In the actual operating process, when the current bucket tooth tip is farther than the reference point in the horizontal direction, as shown in FIG. 3, the number in the first display area 210 is positive, and the second display area 220 above displays the first color with the target length (shadow area).

When the current bucket tooth tip is closer than the reference point in the horizontal direction, as shown in FIG. 4, the number in the first display area 210 is negative, and the second display area 220 below displays the second color with the target length (shadow area).

In an embodiment of the present application, as shown in FIG. 6, the first display area 210 can be a rectangular electronic display, and the second display area 220 can be a lamp belt composed of LED lamps. The length of the opened LED lamps in the lamp belt is used to characterize the magnitude of the difference degree.

The second display area 220 on the left side of the first display area 210 can represent that in view of the operator's operating position, relative to the front of the excavator, there is a rotation angle to the left of 0-180 degrees; and the second display area 220 on the right of the first display area 210 can represent that in view of the operator's operating position, relative to the front of the excavator, there is a rotation angle to the right of 0-180 degrees.

Referring to the layout of LED lamps at the second display area 220, a lampshade can be arranged outside the LED lamps to form a continuous lamp strip when observed by naked eyes. The LED lamps can also be distributed as discrete color blocks when observed by naked eyes, and the increasing of the target length is displayed by the gradual lighting of the color blocks. By quantifying the target length as the number of lighted color blocks, the display of information is more intuitive.

In other embodiments, the difference degree is expressed in the form of the sector-shaped color block in a circle. The central angle corresponding to the sector-shaped color block is related to the absolute value of the difference degree.

In the above-mentioned embodiments, the numerical information and image information are displayed by the display screen and the lamp belt respectively, which is highly popular and easy to maintain.

In some embodiments of the present application, the display device includes a first display module, a second display module and a third display module. Each of the first display module, the second display module and the third display module includes the display screen and the lamp belt on both sides of the display screen The first display module and the third display module are provided on left and right sides of a windshield, and extend vertically, and the second display module is provided on an upper part of the windshield and extends horizontally.

It should be noted that the first display module, the second display module and the third display module can display different information at the same time, and can also display the same type of information under specific working requirements. For example, displaying the same information on the first display module and third display module assists the operator in adjusting current working parameters.

Each of the three has a distance to the nearest edge of the windshield of 0 mm-200 mm, a height to the bottom of the windshield of 0 mm-800 mm, a length of the extension direction of 50 mm-1500 mm, and a width of the lamp belt of 1 mm-100 mm.

Figure 11:
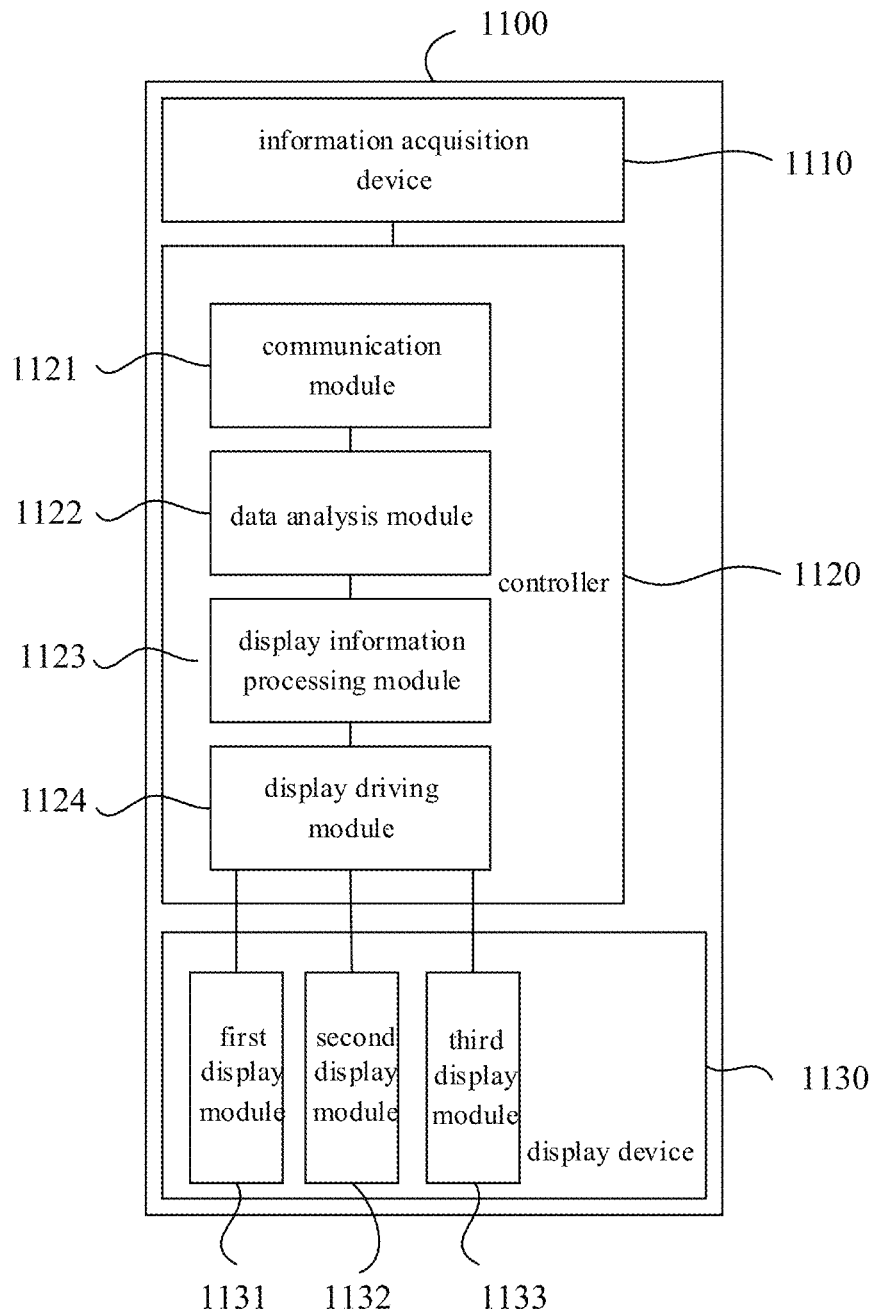
FIG. 11 is a structural diagram of an auxiliary display system for operating machinery according to the present application.

In an embodiment of the present application, as shown in FIG. 11, the auxiliary display system 1100 of the operating machinery can include an information acquisition device 1110, controller 1120, a display device 1130 and a windshield glass.

The controller 1120 can include a communication module 1121, a data analysis module 1122, a display information processing module 1123 and a display driving module 1124.

The communication module 1121 is configured to transmit the information collected by the information acquisition device 1110 to the data analysis module 1122.

The data analysis module 1122 is configured to convert the received communication signals into physical quantities that need to be displayed, and then these physical quantities are transmitted to the display information processing module 1123.

The display information processing module 1123 is configured to process the physical quantities related to the display information obtained from the data analysis module 1122 into the digital quantities of each display object, such as the logic value of the control circuit of a digital tube or a lamp bar.

The display driving module 1124 is configured to receive the number input by the display information processing module 1123 and convert it to the corresponding drive signal after amplification to drive the digital tube or the lamp to display various information and directly display the relevant graphics and values on three small screens.

The display device 1130 can include a first display module 1131, a second display module 1132 and a third display module 1133.

As shown in FIG. 9, the display device 1130 can be located in the upper middle part of the windshield d.

The first display module 1131 can be provided at position a, the second display module 1132 can be provided at position b, and the third display module 1133 can be provided at position c. The first display area 210 can be a display screen, and the second display area 220 can a lamp belt.

The first display module 1131 and the third display module 1133 can be respectively distributed on the left and right ends of the windshield 1140, and extend vertically; and the second display module 1132 can be distributed on the upper middle part of the windshield 1140 and extend horizontally.

During the operating process, the information acquisition device 1110 is used to collect the setting value of the auxiliary system, the current state information of the auxiliary system of the excavator and the posture information of the excavator, such as preset left and right rotation angles, a current height of a bucket tooth tip from a reference point, a current extension distance of a bucket tooth tip from a reference point, a current rotation angle, an excavator body roll angle and an excavator body pitch angle.

The controller 1120 is electrically connected with the information acquisition device 1110 and the display device 1130 and is configured to control the display device 1130 based on the target parameters and the current working parameters of the operating machinery.

The data analysis module 1122 is configured to convert communication information into input physical quantities.

The display information processing module 1123 is configured to process physical quantities to be desired display targets, and the display device 1130 is driven by the display driving module 1124.

The display device 1130 is configured to output the numerical information used to characterize the target parameters on the screen, and the image information used to characterize the difference degree between the working parameters and the target parameters on the lamp belt.

In the first display module 1131, the second display module 1132 and the third display module 1133, the excavator height, rotary auxiliary/state and extension information are displayed respectively.

However, the present application is not limited to this. Where the communication mode of the communication module 1121 can be selected according to needs, and includes, but is not limited to, various serial, parallel and wireless communication modes, such as RS232, RS422, CAN, LIN, Bluetooth, Wi-Fi, and the like.

In the above embodiment, the combination arrangement of the first display module, the second display module and the third display module can achieve displaying of at least three different information and expand the types of key information that can be displayed.

According to the auxiliary display system for operating machinery provided in the present application, through obtaining difference degree information and displaying the combination of numerical and image information display, the selection of key information and the intuitive and clarity of the display of key information are realized, and the safety during operation is enhanced.

Figure 12:
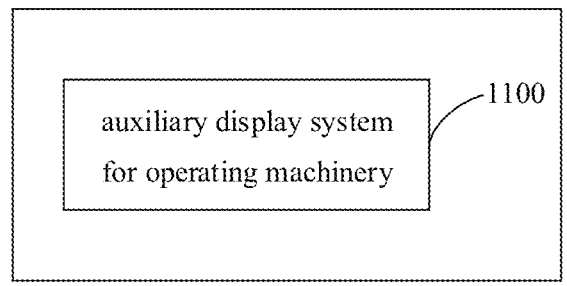
FIG. 12 is a structural diagram of an operating machinery according to the present application.

In an embodiment of the present application, an operating machine is provided, as shown in FIG. 12, which includes the above-mentioned auxiliary display system 1100 of the operating machine.

Figure 13:
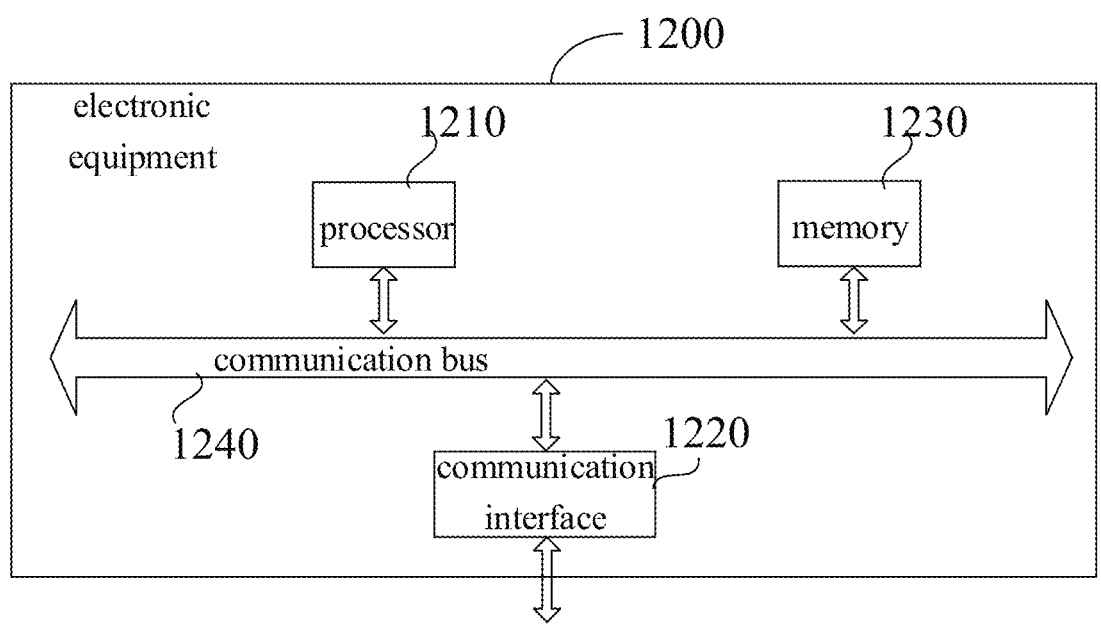
FIG. 13 is a structural diagram of an electronic equipment according to the present application.

FIG. 13 illustrates the physical structure diagram of an electronic equipment. The electronic equipment 1200 can include: a processor 1210, a communication interface 1220, a memory 1230 and a communication bus 1240.

The processor 1210, the communication interface 1220 and the memory 1230 can communicate with each other through the communication bus 1240.

The processor 1210 can call the logic instructions in the memory 1230 to perform the auxiliary display method for operating machinery. The method includes: receiving current working parameters of the operating machinery; generating numerical information used to characterize the working parameters and image information used to characterize a difference degree between the working parameters and target parameters based on the working parameters and the target parameters; and displaying the numerical information in a first display area of a windshield of the operating machinery and displaying the image information in a second display area of the windshield.

In addition, the logic instructions in the above memory 1230 can be realized in the form of software functional units and can be stored in a computer readable storage medium when sold or used as independent products.

Based on this understanding, the solutions of the present application can be presented in the form of software products in essence, or in part contributing to existing technologies, or in part of the solutions.

The computer software product is stored in a storage medium, including instructions to enable a computer device (which can be a personal computer, a server, or a network device, and the like) to perform all or part of the steps described in each embodiment of the present application.

The above-mentioned storage media include a U disk, a mobile hard disk, a read-only memory (ROM), a random access memory (RAM), a disk or a CD and other media that can store program code.

On the other hand, the application also provides a computer program product. The computer program product includes computer program stored in a non-transitory computer readable storage medium, and the computer program includes program instructions. When the program instructions are executed by the computer, the computer can perform the auxiliary display method for operating machinery provided by the above-mentioned method.

The method includes: receiving current working parameters of the operating machinery; generating numerical information used to characterize the working parameters and image information used to characterize a difference degree between the working parameters and target parameters based on the working parameters and the target parameters; and displaying the numerical information in a first display area of a windshield of the operating machinery and displaying the image information in a second display area of the windshield.

On the other hand, the present application also provides a non-transitory computer readable storage medium, having computer program stored therein, and when the program is executed by the processor, steps of the auxiliary display method for operating machinery mentioned above are performed.

The method includes: receiving current working parameters of the operating machinery; generating numerical information used to characterize the working parameters and image information used to characterize a difference degree between the working parameters and target parameters based on the working parameters and the target parameters; and displaying the numerical information in a first display area of a windshield of the operating machinery and displaying the image information in a second display area of the windshield.

The device embodiments described above are only illustrative, where the units described as separate components may or may not be physically separated, and the components displayed as units may or may not be physical units, that is, they may be located in one place, or it can be distributed over multiple network units.

Some or all of the modules may be selected according to actual needs to achieve the purpose of the solution in this embodiment. Those of ordinary skill in the art can understand and implement it without creative effort.

From the description of the above embodiments, those skilled in the art can clearly understand that each embodiment can be implemented by means of software and a necessary general hardware platform, and can also be implemented by hardware.

Based on this understanding, the above-mentioned solutions can be embodied in the form of software products in essence or the parts that make contributions to the prior art, and the computer software products can be stored in computer-readable storage media, such as a ROM/RAM, a disk, a CD, and the like, and includes several instructions for executing a computer device (which may be a personal computer, a server, or a network device, and the like) to perform the methods described in various embodiments or some parts of the embodiments.

Finally, it should be noted that the embodiments mentioned above are only used to explain the solutions of the present application, and are not limited thereto; although the present application has been described in detail with reference to the foregoing embodiments, it should be understood by those skilled in the art that they can still modify the solutions documented in the foregoing embodiments and make equivalent substitutions to a part of the features; these modifications and substitutions do not make the essence of the corresponding technical solutions depart from the spirit and scope of the solutions of various embodiments of the present application.

What is claimed is:

1. An auxiliary display method for operating machinery, comprising:
   receiving current working parameters of the operating machinery;
   generating numerical information used to characterize the working parameters and image information used to characterize a difference degree between the working parameters and target parameters based on the working parameters and the target parameters; and
   displaying the numerical information in a first display area of a windshield of the operating machinery and displaying the image information in a second display area of the windshield,
   wherein the displaying the image information in the second display area of the windshield comprises
      displaying the image information in the second display area with a target length, wherein the target length is related to an absolute value of the difference degree, and further wherein when the difference degree is negative, the target length is inversely proportional to the absolute value of the difference degree, and when the difference degree is positive, the target length is proportional to the absolute value of the difference degree.

2. The method according to claim 1, further comprising: outputting prompt information when the different degree is less than a target value.

3. The method according to claim 1, wherein the displaying the image information in the second display area of the windshield comprises:
   displaying the image information in the second display area on a first side of the first display area when the working parameters are less than the target parameters; and
   displaying the image information in the second display area on a second side of the first display area when the working parameters are greater than the target parameters,
   wherein the working parameters comprise stretching parameters and height parameters.

4. The method according to claim 1, wherein the displaying the image information in the second display area of the windshield comprises:
   displaying a reference mark at a target position of the second display area based on the target parameters, wherein the second display area comprises two segments on both sides of the first display area; and
   displaying the image information in a target color in the second display area, and a distance between the image information and the reference mark is positively correlated with the absolute value of the difference degree,
   wherein the working parameters comprise rotation angle parameters.

5. The method according to claim 1, wherein the displaying the numerical information in the first display area of the windshield of the operating machinery comprises:
   displaying the target parameters and the current working parameters in the first display area when a rotary auxiliary mode is turned on; and
   displaying a roll angle and a pitch angle in the first display area when the rotary auxiliary mode is turned off.

6. An electronic equipment, comprising a memory, a processor and a computer program stored in the memory and executable by the processor, wherein the program, when executing the program, implements steps of the auxiliary display method for operating machinery according to claim 1.

7. A non-transitory computer readable storage medium on which a computer program is stored, wherein the computer program, when executed by the processor, causes the processor to implement steps of the auxiliary display method for operating machinery according to claim 1.

8. An auxiliary display device for operating machinery, comprising:
   an input module, configured to obtain current working parameters and target parameters of the operating machinery;
   a processing module, configured to calculate a difference degree between the working parameters and the target parameters; and
   an output module, configured to generate numerical information used to characterize the working parameters and image information used to characterize the difference degree between the working parameters and target parameters, and output the numerical information to a first display area on a windshield, and output the image information to a second display area on the windshield,
   wherein the output module is further used to display the image information in the second display area with the target length, wherein the target length is related to the absolute value of the difference degree, and further wherein when the difference degree is negative, the target length is inversely proportional to the absolute value of the difference degree, and when the difference degree is positive, the target length is proportional to the absolute value of the difference degree.

9. An auxiliary display system for operating machinery, comprising:

an information acquisition device, configured to collect current working parameters of the operating machinery;

a windshield, comprising a first display area and a second display area; and a display device and a controller, wherein the controller is electrically connected with the information acquisition device and the display device, and configured to control the display device to output numerical information used to characterize working parameters and image information used to characterize a difference degree between the working parameters and target parameters based on the target parameters and the working parameters of the operating machinery, and display the numerical information in the first display area and display the image information in the second display area, wherein the image information is displayed in the second display area with the target length, the target length is related to the absolute value of the difference degree, and further wherein when the difference degree is negative, the target length is inversely proportional to the absolute value of the difference degree, and when the difference degree is positive, the target length is proportional to the absolute value of the difference degree.

10. The system according to claim 9, wherein the display device comprises a display screen and a lamp belt on both sides of the display screen, wherein the display screen is provided in the first display area and the lamp belt is provided in the second display area.

11. The system according to claim 10, wherein the display device comprises:

a first display module, a second display module and a third display module, wherein each of the first display module, the second display module and the third display module comprises the display screen and the lamp belt on both sides of the display screen;

the first display module and the third display module are respectively provided on left and right sides of the windshield, and extending vertically; and the second display module is provided on an upper middle part of the windshield and extending horizontally.

12. An operating machinery, comprising the auxiliary display system for operating machinery according to claim 9.

* * * * *